June 26, 1923.
A. W. MALEY
1,459,788
BRAKE FOR TRAMWAY AND RAILWAY ROLLING STOCK
Filed June 21, 1920
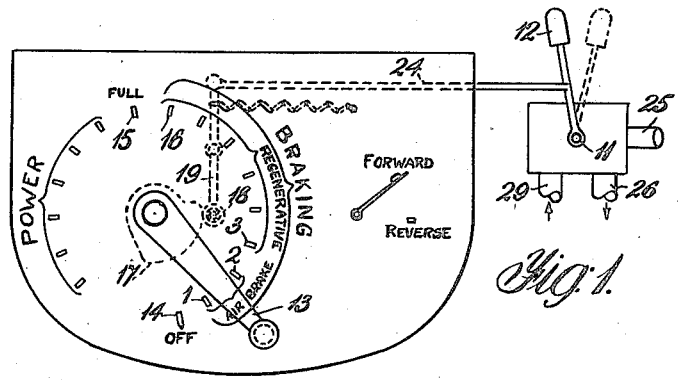
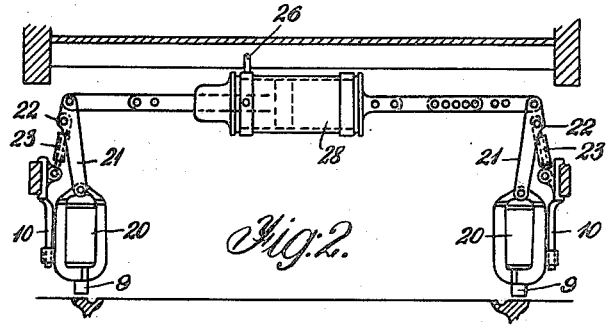
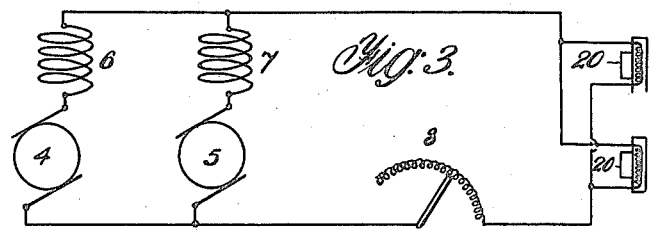
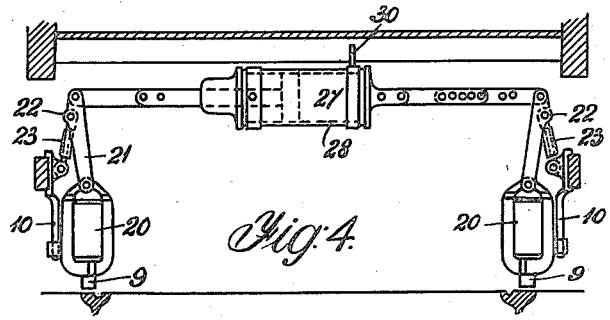
INVENTOR
Alfred Walter Maley
by A. E. O'Dell
Attorney.

Patented June 26, 1923.

1,459,788

UNITED STATES PATENT OFFICE.

ALFRED WALTER MALEY, OF WEST BROMWICH, ENGLAND.

BRAKE FOR TRAMWAY AND RAILWAY ROLLING STOCK.

Application filed June 21, 1920. Serial No. 390,567.

*To all whom it may concern:*

Be it known that I, ALFRED WALTER MALEY, a subject of the King of Great Britain and Ireland, residing at Eagle Works, Moore Street, West Bromwich, in the county of Stafford, England, have invented new and useful Brakes for Tramway and Railway Rolling Stock (for which I have filed an application in England March 3, 1914, No. 6,443 of 1914), of which the following is a specification.

This invention is concerned with braking upon electric tramway and railway vehicles. It utilizes the well-known regenerative braking system, wherein the electric motors which normally propel the vehicle are driven by it and generate current; and it combines this system with the equally well-known track-brake, taking advantage of the properties of the latter to obviate defects of the former, and thereby producing a reliable and effective braking apparatus.

Regenerative braking is open to the danger that too severe an application of the brake renders it inoperative; for if the motors be allowed to generate too large a current, the resulting magnetic flux exerts such a torque as will skid the wheels, and skidding does not cease until the flux has had time to fall to a substantially lower value.

The application of a track-brake by pressure exerted between a shoe bearing on the track and some part of the vehicle, tends to lift the vehicle, and lessens the weight upon the wheels.

According to this invention a track-brake which, when in action tends to lift the vehicle is controlled from the same handle as governs regenerative braking; and in such manner that at every stage of regenerative braking the track brake is so far applied as to avoid any danger of locking and skidding the wheels.

Neither the construction of the track-brake in itself, nor the construction of the regenerative braking apparatus in itself, forms any part of the invention. In the accompanying drawings, therefore, they are illustrated only so far as is necessary to explain the invention and such features as are shown are to be regarded as examples of braking mechanism only, and not as essential features of the invention.

Figure 1 shows diagrammatically the application of the invention to a controller of ordinary type.

Figure 2 shows a typical power operated track brake mechanism.

Figure 3 is a diagram of usual regenerative braking connections.

Figure 4 shows a slight modification of Figure 2.

In Figure 1 the controller handle 13 works over running or power notches 14—15 during driving, varying connections in any well-known manner to vary the speed of the motors. On notch 14 the motors are out of circuit; on notch 15 they are connected for full speed running. The controller works over notches 14—16 for braking, and for the purpose of this invention the circuit for regenerative braking is first completed upon the handle reaching notch 3 to the right of notch 14 while moving in a counter-clockwise direction.

The circuits thus completed by the controller in well known manner are diagrammatically illustrated in Figure 3, where 4, 5 represent the two motor armatures now generating current, 6, 7 their series fields, and 8 a resistance which is gradually cut out by the controller as its handle passes from notch 3 to notch 16. This resistance may complete the generator circuit. But frequently the current generated is employed to operate a magnetic brake as diagrammatically illustrated at 20, 20. In Figures 2 and 4; 9, 9 are track brake shoes adapted to bear on the rails on which the vehicle travels. They slide vertically on guides 10 and are normally supported out of contact with the rail by levers 21 pivoted at 22 to links 23 carried by the vehicle frame. A cylinder 28 is connected with one of the levers 21, and its piston 27 with the other. By admission of pressure fluid to the left-hand end of the cylinder by pipe 26 as in Figure 2, or by connection of the right hand end to vacuum apparatus by the pipe 30 as in Figure 4, the track brakes may be applied, and their re-action through the pivots 22 will tend to lift the vehicle and lighten the load on the wheels. In existing systems such admission of pressure fluid, or connection to vacuum apparatus, is commonly effected by a valve 11 (Figure 1) operated by a handle 12. In the case of pressure apparatus, for instance, pipe 29 may be supplied with compressed air, and pipe 26 which enters the left hand end of the cylinder is capable of being joined by the valve 11 either to pipe 29 or to an outlet pipe 25. As stated, however, the details of such operation form no part of this invention.

To apply the invention to a vehicle having a controller for driving and regenerative braking as shown in Figures 1 and 3 and a track brake as shown in Figures 1 and 2, the separate control handle for the track brake can be dispensed with and the track brake mechanism is inter-connected with the controller handle, so that the track brake is applied before regenerative braking begins. Such inter-connection is diagrammatically illustrated in Figure 1 by a cam 17 secured upon the controller spindle, and a spring-pulled lever 19 which carries a roller 18 bearing on the cam and is connected through the rod 24 with the valve 11.

That part of the cam 17, which contacts with the roller 18 while the controller handle is working over the driving notches 14 to 15 is concentric with the controller spindle and therefore does not actuate the track brake. But, as Figure 1 shows, an enlargement of the cam thrusts out the roller 18 before the handle reaches the first regenerative braking notch to maintain the application of power to the track brake. Consequently the track brake is applied before the regenerative brake. Thereafter the roller bears against a part of the cam of larger radius which maintains valve 11 in the position for applying the track brake.

Since regenerative braking does not begin until notch 3 is reached the track brake will first be fully applied before the regenerative circuit is closed. A part of the weight of the vehicle is thus taken off the wheels so lessening the torque which can be applied through the wheels as a result of the momentum of the vehicle to the motor axle. This limitation of torque sets a limit to the current which can be generated by the motors; so that even if a nervous driver hurriedly and improperly carries his controller handle over the regenerative braking notches towards notch 16 he cannot thereby bring about a dangerous increase of current and skid the wheels. It is desirable that the maximum current attainable in regenerative braking should only be such as will just bring the magnetic circuit of the motors to saturation.

Thus in operation small braking effects, such as may be needed in coasting, will be secured by bringing the controller handle only to notches 1 and 2 so applying the track brake; more rapid braking, such as may be required for a service stop, or, more particularly, for an emergency stop, is secured by carrying the controller handle to notch 3 or the notches beyond up to 16, whereby after the track brake has been fully applied regenerative braking can be commenced and increased to but not beyond the useful limit set by the diminution in the load on the wheels due to the track brake action. At all times the track brake materially lessens the work to be done by the regenerative brake and so prevents overheating of the motors.

It will be understood that the interconnection illustrated is typical of the invention only; it is not essential to the invention that a cam should be the means of operating the track brake mechanism and keeping it operated.

Equally, as has been indicated, the invention is not limited to the particular controller and brake mechanism shown. The track brake has been illustrated as equipped with an electromagnet winding 20, such as might form a suitable circuit to receive the regenerative braking current as shown in Figure 3; so that the track brake may be applied magnetically in well known manner as well as mechanically; but this is not essential; the track brake may be mechanical only.

In some existing systems regenerative braking is governed by a controller separate from the driving controller. In applying the invention to these systems the track brake will be connected with the braking controller. But to prevent waste of power such a braking controller ought as now usual always to be interlocked with the driving controller so that the brakes can never be applied while driving power is on, nor vice versa.

What I claim is:
1. In an electrically driven rail vehicle the combination with a regenerative braking controller of a track brake, and means actuated by said controller for applying said track brake by pressure exerted between said brake and said vehicle.

2. In an electrically driven vehicle the combination of a regenerative brake, a brake which in action tends to lift the vehicle, and a controller governing both of said brakes simultaneously.

3. In an electrically driven vehicle the combination of a regenerative braking controller, a track brake, and means actuated by said controller governing said track brake, whereby said track brake is applied before regenerative braking commences.

4. In an electrically driven vehicle the combination with the driving motors of a controller adapted to connect said driving motors for regenerative braking, a power operated track brake, a valve controlling said track brake and connections between the controller and said valve whereby the track brake is actuated before regenerative braking commences.

5. In an electrically driven vehicle the combination with the driving motors of a controller adapted to vary the connections of said motors for driving purposes and to connect them for regenerative braking, a power operated track brake, a valve controlling said track brake and connections between the controller and said valve whereby the track brake is actuated before regenerative braking commences.

In testimony whereof I have signed my name to this specification.

ALFRED WALTER MALEY.